(12) United States Patent
Cyman, Jr. et al.

(10) Patent No.: US 8,289,538 B2
(45) Date of Patent: Oct. 16, 2012

(54) SYSTEMS AND METHODS FOR MANAGING PRINT JOBS

(75) Inventors: Theodore F. Cyman, Jr., Grand Island, NY (US); Robert D. Doyle, Tonawanda, NY (US); William D. Romanowich, Williamsville, NY (US); Paul A. Coniglio, East Amherst, NY (US); Nancy A. Lee, East Amherst, NY (US)

(73) Assignee: Moore Wallace North America, Inc., Chicago, IL (US)

( * ) Notice: Subject to any disclaimer, the term of this patent is extended or adjusted under 35 U.S.C. 154(b) by 1333 days.

(21) Appl. No.: 11/729,159

(22) Filed: Mar. 28, 2007

(65) Prior Publication Data
US 2008/0239366 A1    Oct. 2, 2008

(51) Int. Cl.
G06F 3/12    (2006.01)
G06K 1/00    (2006.01)

(52) U.S. Cl. ...................................... 358/1.15; 358/1.13

(58) Field of Classification Search .................... 358/1.1, 358/1.9, 1.13, 1.14, 1.15, 1.17, 1.18, 448, 358/474, 1.8; 709/201, 202, 203, 217, 223
See application file for complete search history.

(56) References Cited

U.S. PATENT DOCUMENTS

| | | | |
|---|---|---|---|
| 4,430,668 A | 2/1984 | Miles, Jr. | |
| 4,477,833 A | 10/1984 | Clark et al. | |
| 4,789,147 A | 12/1988 | Berger et al. | |
| 5,634,091 A | 5/1997 | Sands et al. | |
| 5,706,410 A | 1/1998 | Bagley et al. | |
| 5,796,411 A | 8/1998 | Cyman et al. | |
| 5,949,438 A | 9/1999 | Cyman et al. | |
| 5,960,164 A | 9/1999 | Dorfman et al. | |
| 5,995,721 A | 11/1999 | Rourke et al. | |
| 6,088,702 A | 7/2000 | Plantz et al. | |
| 6,088,710 A | 7/2000 | Dreyer et al. | |
| 6,134,018 A | 10/2000 | Dziesietnik et al. | |
| 6,243,172 B1 | 6/2001 | Gauthier et al. | |
| 6,256,104 B1 | 7/2001 | Rumph et al. | |
| 6,275,303 B1 | 8/2001 | Fukaya | |
| 6,327,599 B1 | 12/2001 | Warmus et al. | |
| 6,332,149 B1 | 12/2001 | Warmus et al. | |
| 6,353,483 B1 | 3/2002 | Laverty et al. | |
| 6,381,028 B1 | 4/2002 | Gauthier | |
| 6,396,593 B1 | 5/2002 | Laverty et al. | |

(Continued)

FOREIGN PATENT DOCUMENTS

CA    2 287 011    3/2001

(Continued)

OTHER PUBLICATIONS

International Search Report and Written Opinion, International Application No. PCT/US008/04099 dated Jun. 11, 2008.

(Continued)

Primary Examiner — Gabriel Garcia
(74) Attorney, Agent, or Firm — McCracken & Frank LLC

(57) ABSTRACT

A system for managing a job in accordance with a job specification and job content includes a database that stores device information and a configuration engine. The configuration engine is responsive to the job specification and the database and identifies one or more device configurations that are capable of producing the job. The system also includes a controller that is responsive to a selection from the one or more device configurations to produce a command stream in a format compatible with the selection.

45 Claims, 9 Drawing Sheets

U.S. PATENT DOCUMENTS

| | | | |
|---|---|---|---|
| 6,446,100 B1 | 9/2002 | Warmus et al. | |
| 6,606,165 B1* | 8/2003 | Barry et al. | 358/1.9 |
| 6,608,697 B1 | 8/2003 | Schorr et al. | |
| 6,633,890 B1 | 10/2003 | Laverty et al. | |
| 6,707,563 B1* | 3/2004 | Barry et al. | 358/1.14 |
| 6,789,879 B2 | 9/2004 | Khalid | |
| 6,814,511 B2 | 11/2004 | Bhatti | |
| 6,826,534 B1 | 11/2004 | Gupta et al. | |
| 6,895,554 B2 | 5/2005 | Endress et al. | |
| 6,898,601 B2 | 5/2005 | Amado et al. | |
| 6,952,801 B2 | 10/2005 | Warmus et al. | |
| 6,980,964 B1 | 12/2005 | Cocotis et al. | |
| 6,981,214 B1 | 12/2005 | Miller et al. | |
| 7,096,143 B2* | 8/2006 | Ternasky et al. | 702/123 |
| 7,168,784 B2 | 1/2007 | Donovan et al. | |
| 7,454,162 B2 | 11/2008 | Segerer et al. | |
| 2001/0048533 A1 | 12/2001 | Koana | |
| 2002/0078012 A1 | 6/2002 | Ryan et al. | |
| 2002/0149792 A1 | 10/2002 | Gauthier et al. | |
| 2002/0152183 A1 | 10/2002 | Soares et al. | |
| 2002/0165760 A1 | 11/2002 | Delurgio et al. | |
| 2003/0002069 A1 | 1/2003 | Bhogal et al. | |
| 2003/0023636 A1 | 1/2003 | Lee et al. | |
| 2003/0154137 A1 | 8/2003 | Carroll et al. | |
| 2003/0231328 A1 | 12/2003 | Chapin et al. | |
| 2004/0008359 A1 | 1/2004 | Christiansen | |
| 2004/0196496 A1 | 10/2004 | Klassen | |
| 2004/0205462 A1 | 10/2004 | Levine | |
| 2005/0063010 A1 | 3/2005 | Giannetti | |
| 2005/0080750 A1 | 4/2005 | Carling et al. | |
| 2005/0099649 A1* | 5/2005 | Ferlitsch et al. | 358/1.15 |
| 2005/0111044 A1 | 5/2005 | Giannetti | |
| 2005/0111867 A1 | 5/2005 | Hatano | |
| 2005/0125726 A1 | 6/2005 | Harper et al. | |
| 2005/0216832 A1 | 9/2005 | Giannetti | |
| 2005/0289461 A1 | 12/2005 | Amado et al. | |
| 2006/0082814 A1 | 4/2006 | Gardner | |
| 2006/0107194 A1 | 5/2006 | Gale | |
| 2006/0136307 A1 | 6/2006 | Hays et al. | |
| 2006/0156232 A1 | 7/2006 | Giannetti et al. | |
| 2006/0164679 A1 | 7/2006 | Kim et al. | |
| 2006/0248454 A1 | 11/2006 | Giannetti | |
| 2008/0037047 A1 | 2/2008 | Condon et al. | |
| 2008/0278740 A1 | 11/2008 | Bird et al. | |
| 2009/0033986 A1 | 2/2009 | Himpe | |

FOREIGN PATENT DOCUMENTS

| | | |
|---|---|---|
| EP | 917 042 | 5/1999 |
| EP | 1 033 645 | 9/2000 |
| EP | 1 498 839 A2 | 1/2005 |
| EP | 1 724 673 | 11/2006 |
| EP | 1 975 772 A2 | 10/2008 |
| GB | 2387817 A | 10/2003 |

OTHER PUBLICATIONS

Search Report in European Application No. 08 00 5957 dated Dec. 22, 2008.

International Search Report and Written Opinion in PCT/US2008/013837 dated Mar. 19, 2009.

Int'l Search Report and Written Opinion in PCT/US2008/011562 dated Dec. 23, 2008.

Int'l Preliminary Report on Patentability for Application No. PCT/US2008/13837 dated Jun. 22, 2010.

Reply to Written Opinion prepared by the EPO, dated Sep. 1, 2010 for Application No. EP2225709.

Int'l Preliminary Report on Patentability for Application No. PCT/US2007/03241 dated Sep. 29, 2009.

Int'l Preliminary Report on Patentability for Application No. PCT/US2008/11562 dated May 25, 2010.

Amended claims after receipt of European search report, and letter from Mr. Marshall Grahame (Serjeants) to the EPO dated Aug. 4, 2010, re: amended claims for Application No. EP2223266.

Communication from the EPO Examining Division dated Mar. 24, 2011 and annex to the communication, re: examination response to amended claims for Application No. EP2223266.

EPO Office Action for Appl. No. 08 005 957.9-1245, dated Dec. 4, 2009.

Response letter and all enclosures (amended claims of main request, amended claims of auxiliary request, replacement pp. 1 to 3, amended pages in track changes format) to EPO for Appl. No. 08 005 957.9-1245, dated Apr. 13, 2010.

* cited by examiner

JOB SPECIFICATION — 88

Job template - utility bill

Job requirements - duplex, 8.5x11 finished size, letter inserted into envelope

Job size - 5,000 recipients, two pages

Production Timeline - 6 days

Job cost - $2,500

90

| Device Configuration | Availability | Speed | Time | Cost/Page | Total Cost |
|---|---|---|---|---|---|
| Press 1, Inserter X | busy | 50 | 20 | 0.02 | 950 |
| Press 2, Finisher A, Inserter X | ready | 100 | 15 | 0.045 | 1,600 |
| Press 3, Finisher B, Inserter X | offline | 75 | 50 | 0.015 | 800 |

SYSTEMS AND METHODS FOR MANAGING PRINT JOBS

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to systems and methods for managing the production of a job, and more particularly to systems and methods for managing print jobs produced by configurations of printing and finishing devices in one or more facilities.

2. Description of the Background of the Invention

Generally, when a customer requests production of a print job, a production coordinator at a printing facility selects one or more devices at the printing facility that can produce the print job. The production coordinator at the printing facility receives a variety of print job requests from different customers, and due to the specific requirements of each print job, the production coordinator first examines the devices at the printing facility to determine whether the printing facility is capable of producing the print job.

Typically, a printing facility has a variety of presses and finishing (sheeting, folding, stapling, inserting, binding, etc.) devices to accommodate different print jobs, wherein there may be several combinations of printing and finishing devices that can be used to reproduce the capabilities needed to produce the print job. Also, the capabilities of different devices vary, for example, some presses have certain finishing capabilities integrated therewith while other presses are used with in-line or off-line finishing devices. Some presses print with only one color such as black, others print with one or more spot or highlight colors in addition to black, and yet other presses print with four or more process colors (e.g., light cyan, cyan, light magenta, magenta, yellow, black, etc.) to print images. In addition, presses may be roll-fed or sheet-fed, configured to print simplex or duplex (i.e., on one side or both sides of a sheet or web of paper), and/or may print on a variety of roll widths or sheet sizes.

Different devices also differ in data formats that are compatible therewith. Commonly used data formats include PostScript, PDF, AFP and IPDS (the last two are IBM developed formats), Metacode (a Xerox developed format), and IJPDS (a Scitex developed format). For example, a job that includes job files received from a customer in Metacode format would typically be printed using Xerox equipment. However, if the data files can be converted from Metacode to AFP, then IBM equipment may also be used.

The production coordinator analyzes the available devices at the printing facility and identifies one or more device configurations to produce the print job, wherein a device configuration may include an in-line and/or off-line combination of a plurality of devices or the configuration of a single device. In addition, the production coordinator weighs workloads and costs of producing the print job on the device configuration(s) before selecting a device configuration to produce the print job. The production coordinator selects the device configuration that minimizes production time and maximizes profit. The process of selecting the optimal device configuration to produce a job increases in complexity with the size of the print job, the size of the printing facility (i.e., the number of printing and finishing devices), the number of print jobs produced in the printing facility, the use of multiple printing facilities, and so on.

SUMMARY OF THE INVENTION

In one embodiment, a system for managing a job in accordance with a job specification and job content includes a database that stores device information and a configuration engine. The stored device information includes the availability of printing devices and finishing devices. The configuration engine analyzes the job specification and the database to identify first and second device configurations that are capable of producing the job. The first device configuration specifies using a first printing device with a first finishing device and the second device configuration specifies using the first printing device with a second finishing device. The system also includes a controller that is responsive to a selection from the one or more device configurations to produce a command stream in a format compatible with the selection.

In another embodiment, a system for managing the production of a print job amongst a plurality of print facilities includes a database that stores information associated with printing and finishing devices and a configuration engine. The information includes device availability and quality levels. The configuration engine is responsive to a job specification and the database and identifies first and second combinations of devices capable of producing the print job with a quality level that matches a quality level associated with the print job. The first combination specifies using a first printing device with a first finishing device and the second combination specifies using the first printing device with a second finishing device. The system includes an interface through which a selection is made selecting one or more of the combinations of devices to produce the job. The system further includes a controller responsive to the selection from the one or more combinations of devices that converts a command stream into a format compatible with the selection. The database stores device profiles and at least one of virtual device definitions, device configurations, configuration files, and job templates. The configuration engine associates the job specification with at least one of the virtual device definitions and job templates. The selection from the one or more combinations of devices is based on the association.

According to a further embodiment, a method for managing a job in accordance with a job specification and job content includes the steps of storing device information and identifying first and second device configurations that are capable of producing the job, wherein the identification is responsive to the job specification and the stored device information and the first device configuration specifies using a first printing device with a first finishing device and the second device configuration specifies using the first printing device with a second finishing device. The method further includes the steps of producing a command stream in a format compatible with a selection from the first and second device configurations to produce the job, storing device profiles and at least one of virtual device definitions, device configurations, configuration files, and job templates, and associating the job specification with at least one of the virtual device definitions and the job template, wherein the selection from the first and second device configurations is based on the association.

In yet another embodiment, a method for managing a print job includes the steps of storing information associated with devices and identifying first and second combinations of devices capable of producing the print job with a quality level that matches a quality level associated with the print job, wherein the first combination specifies using a first printing device with a first finishing device and the second combination specifies using the first printing device with a second finishing device. The method further includes the steps of converting a command stream into a format compatible with a selection from the one or more combinations of devices to produce the print job, storing device profiles and at least one of virtual device definitions, device configurations, configuration files, and job templates, and associating the job specification with at least one of the virtual device definitions and the job template. The selection from the one or more combinations of devices is based on the association.

Other aspects and advantages of the present invention will become apparent upon consideration of the following detailed description.

BRIEF DESCRIPTION OF THE DRAWINGS

FIG. 5 a table of sample candidate device configurations for producing a print job;

DETAILED DESCRIPTION OF THE PREFERRED EMBODIMENTS

Figure 1:
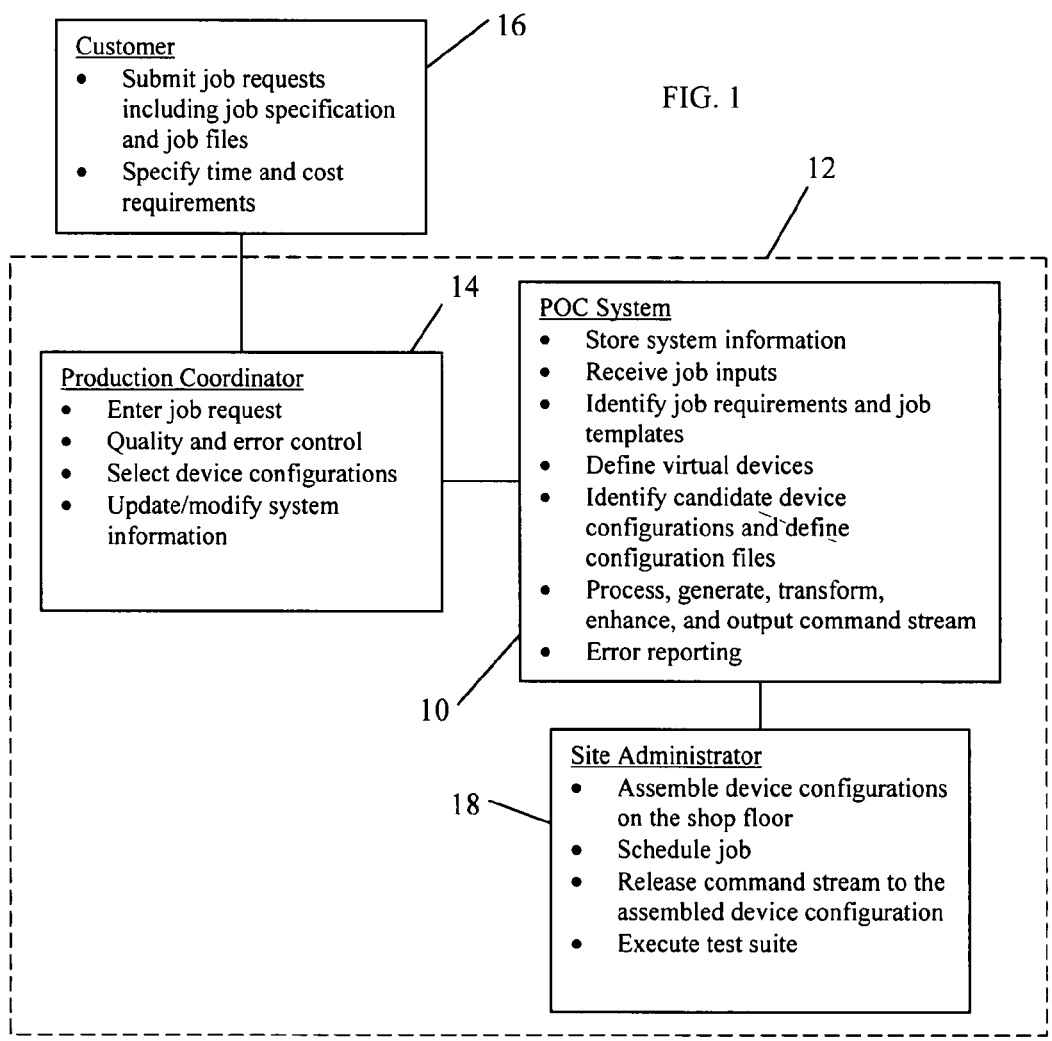
FIG. 1 is a functional diagram of a print management system.

FIG. 1 shows a system 10 that facilitates the management of a print job within a printing facility or cell 12, wherein the cell contains various printing and finishing devices to produce the print job. The system 10 according to this embodiment is referred to as a print on command ("POC") system that integrates and automates many of the steps previously performed manually by a production coordinator 14 to produce the print job at the cell 12. Generally, a customer 16 submits a job request to the production coordinator 14 and specifies time and cost requirements for production of the job. The job request includes a job specification and job files used to produce the print job, such job files include layout files, page templates, content, and resources, for example.

The production coordinator 16 may be located at the cell 12 or may manage the print job from a remote location. The production coordinator 14 enters the job specification and job files into the POC system 10 and the job specification is analyzed to identify the capabilities needed to produce the print job. In one embodiment, the analysis of the job specification is performed by the POC system 10. The POC system 10 also identifies one or more virtual devices that define the general device capabilities needed to produce the print job. In addition, the POC system 10 stores information regarding devices at the cell 12 that is used to identify one or more candidate device configurations that can reproduce the capabilities of each virtual device. The production coordinator 16 selects one or more device configurations from the candidate device configurations to produce the print job.

Thereafter, the POC system 10 processes the print job, as needed, to produce a print stream that is sent to the selected device configuration(s) for production. In one embodiment, the POC system 10 transforms the job files into formats that are compatible with the devices making up the selected device configuration. The transformed job files are used to produce the print stream that is sent to the assembled device configuration to produce the job. In another embodiment, the print stream is separated into multiple print streams, wherein some print streams are sent to printing devices and other print streams are sent to additional devices for finishing and/or sorting and distribution of the completed print job.

A site administrator 18 located at the cell 12 or at a remote location manages the assembly of the selected device configuration(s) on the shop floor of the cell and schedules the print job for production. Typically, the device configuration is assembled according to a configuration file defined by the system 10. The configuration file defines how physical devices may be combined and configured to reproduce the candidate device configuration(s). The assembly of the device configuration(s) may include the manual interconnection of multiple devices and/or the electronic communication of configuration instructions to one or more devices. In addition, the site administrator 18 can execute a test suite using the devices at the cell 12 to generate the device information stored by the POC system 10.

The POC system 10 allows the production coordinator 14 to manage the print job at all of the stages between the times the print job is submitted until it is produced and delivered in accordance with the job specification. In addition, the POC system 10 facilitates error reporting during each stage of the process, i.e., job submission, device configuration selection, job production, etc., by tracking the status of the print job during each stage. Further, other embodiments of the POC system 10 allow the production coordinator 14 to proof the print job and identify errors and quality control issues prior to releasing the print job for production.

Also, it should be apparent that the functional blocks described above may contain more or less information or overlapping information in other embodiments. For example, in FIG. 1 the production coordinator 14 can update/modify the information stored by the POC system 10. In another embodiment the POC system 10 performs automatic updates/modifications to the stored information. Further, in yet another embodiment the production coordinator 14 selects a device configuration that is not identified by the POC system 10. There are numerous other variations of the POC system 10 that are contemplated and fall within the scope of the disclosure.

Figure 2:
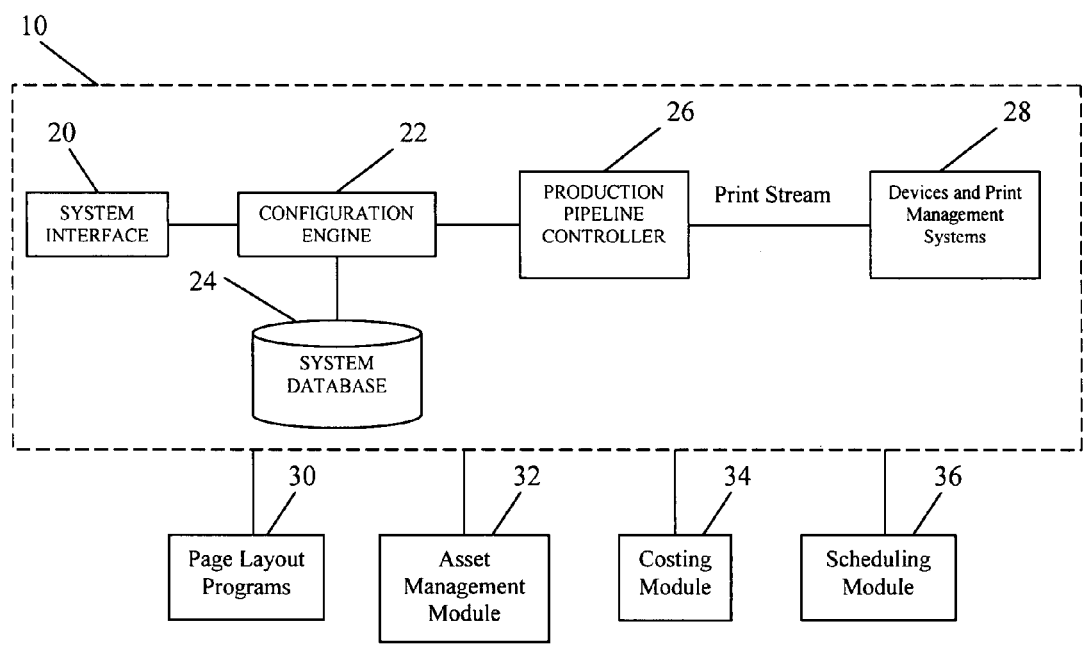
FIG. 2 is a block diagram illustrating an embodiment of the print management system of FIG. 1.

Referring now to FIG. 2, an embodiment of the POC system 10 includes a system interface 20, a configuration engine 22, a system database 24, and a production pipeline controller 26 to generate a print stream sent to devices and/or print management systems 28. A user logs in and accesses the POC system 10 through the system interface 20. Typically, the user will be the production coordinator; however, in other embodiments the customers are also allowed to access the POC system 10. If so, different levels of access are granted depending on the status of the user. For example, in one embodiment, the production coordinator is allowed to update and modify the information stored in the system database 24 and approve jobs for production, while the customer is only allowed to submit job requests including job specifications and job files. The configuration engine 22 is coupled to the system interface 20, the system database 24, and the production pipeline controller 26. In addition, the configuration engine 22 uses information stored in the system database 26 to identify candidate device configurations that can be assembled to meet the capabilities needed to produce the print job. The production pipeline controller 26 performs further processing of the print job and generates the print stream that is sent to printing and finishing devices and/or print management systems 28 to produce the print job. In one embodiment, the POC system 10 is also coupled to a page layout program 30, an asset management module 32, a costing module 34, and a scheduling module 36.

The production coordinator accesses the POC system 10 through the system interface 20 to manage the job request, including entering the job request and selecting device configurations to produce the print job. In one embodiment the production coordinator also uses the system interface 20 to update and modify the information stored in the system database 24.

The typical job specification submitted with the job request defines the layout and finishing requirements for the print job, for example, number of pages, simplex or duplex printing, page size, binding, perforating, and the like. The job specification is also associated with the job files for the print job. The job files include, for example, job templates and job content such as fixed information that stays the same in each document produced for the print job and variable information that changes for specific documents produced for the print job. In another embodiment, additional information is associated with the job specification such as a production timeframe and requested costs. In yet another embodiment, different entities or customers submit different portions of the job request. For example, a job specification and job templates detailing a national advertising campaign may be submitted by a corporate headquarters and the regional offices of the corporation may submit the job content specific for the documents produced for that region. In this example, the page template defines the layout of the print job and the job content includes a database of recipient specific information, wherein the page template and the database are merged to produce a printed product that contains customized content for each recipient.

In addition, the job specification and/or job files may include auditing and tracking information such as a barcode or control number that is included in the documents to further identify each document and to insure that all of the documents are produced and delivered. In another embodiment, the customer associates other information with the job request, for example, a production schedule and allowable costs.

The system database 24 stores the information that is used by the configuration engine 22 to determine if individual printing and finishing devices or combinations of devices are capable of producing the print job. In another embodiment, the information is also used by the configuration engine 22 to determine and match the quality levels associated with producing the print job using different page description languages and combinations of printing and finishing devices. In particular, the information includes, for example, device profiles, virtual device definitions, configuration files, and job templates. The device profiles include information regarding the devices located within a cell, for example, device capabilities, device quality level, supported operating software, compatible page description languages, and auditing capabilities such as barcode readers. The device capabilities incorporate information designating printer resolution, simplex or duplex, print attributes, supported paper sizes, available binding devices and styles, perforation capability, and the like.

In addition, the POC system 10 generates and stores virtual device definitions, device configurations, and configuration files. As stated above, the job request is analyzed to identify one or more virtual device definitions and the configuration engine 22 uses the information stored in the system database 24 to identify one or more device configurations that can reproduce the capabilities of the virtual device. The configuration engine also generates the configuration files that define how physical devices can be assembled and configured on the shop floor to reproduce the selected device configuration(s). The device configurations and configuration files may define a configuration of a single physical device or may define a combination of one or more physical devices that are operated either in combination or sequentially to produce the product.

In one embodiment, the system database 24 stores a first virtual device definition that produces printed, perforated sheets of paper. The system database 24 also stores first and second corresponding configuration files and associated first and second device configurations. The first configuration file defines the first device configuration that includes a combination of a roll-fed press, a perforating unit in-line with the press, and a sheeting unit in-line with the perforating unit. The second configuration file defines the second device configuration that includes a sheet-fed press and an in-line perforating unit. In this example, each of the devices included in the first device configuration may be different from the devices included in the second device configuration, or some or all of the devices may be the same and merely configured differently.

In another embodiment, the system database 24 also stores a second virtual device that produces printed sheets that are inserted into envelopes and ready to enter the mail stream. The system database 24 also stores corresponding third and fourth configuration files and associated third and fourth device configurations. In this case, the third configuration file defines the third device configuration including a combination of a roll-fed press, a sheeting unit in-line with the press, and an off-line inserter that inserts sheets into envelopes. The fourth configuration file defines the fourth device configuration that includes a roll-fed press, a sheeting unit off-line with the press, and an inserter in-line with the sheeting unit. In this example, each of the devices included in the third and fourth device configurations may be different or the device configurations may differ only in the physical location of the devices on the shop floor. Consequently, the production coordinator can consider the time it will take to deliver the output of the press to the off-line finishing equipment when selecting an optimal device configuration to produce the print job.

In a further embodiment, the system database 24 also stores a third virtual device that tracks the printed sheets at different stages during production of the print job. The third virtual device includes multiple device configurations and configuration files that include different scanners such as barcode readers useable in-line or off-line with a press to track sheets produced by the press and other scanners useable at an inserting device to track sheets that are inserted into envelopes. In addition, the third virtual device can be combined with the first or second virtual devices as required by the job request.

In another embodiment, the system database 24 also stores job templates that define the print job in terms of a particular product type, for example, a postcard, a magazine, a utility bill, etc. The job templates are generally associated with one or more virtual devices, device configurations, and configuration files for producing the particular product. In this manner, a print job that is identified with a corresponding job template can be quickly or automatically produced on the associated device configurations.

In addition, some job templates are specific to a customer and others are generic. For example, in one embodiment there are specific and generic job templates stored in the system database 24 for producing a utility bill. The generic job template may or may not be associated with any virtual device(s) and typically is not associated with any specific content. In contrast, the specific job template stored in the system database 24 produces an electricity bill for a return customer, wherein the electricity bill includes additional specific content such as coupon inserts and tracking data. In this case, the system database 24 stores the additional content for the specific job template. Further, in one embodiment the specific job template is associated with specific virtual devices and device configurations for producing the job. In another embodiment, the print job associated with the specific job template is automatically routed to an assembled device configuration on the shop floor for production.

In yet another embodiment, a system operator uses the page layout program 30 to create the page templates for a print job according to layout information and content files submitted by the customer. For example, the system operator can use a page layout program such as Quark Xpress® to create the page template. The system operator checks-in the page template upon creation thereof, and thereafter, if the page template needs modification, the operator checks-out the files for the page template, modifies the files, and checks-in the modified files. The page template is stored along with the content files and resources used for the print job. The POC system 10 provides version control capabilities for files associated with a print job by tracking the modifications made to the page templates and storing various revisions of the page templates. The POC system 10 also stores information regarding different versions of the page templates, for example, the person who made the changes, what changes were made, and a comment or title for the version. Typically, the POC system 10 allows only one copy of the files to be checked-out at a particular time or only allows changes to copies of the stored templates. In another embodiment, this version tracking process is also performed on job templates, virtual device definitions, device configurations, and the like.

The asset management module 32 facilitates the management of files and resources stored by the POC system 10. More particularly, the asset management module 32 facilitates the checking-in and checking-out of job files and the identification and retrieval of resources that are to be used for specific print jobs. In addition, the costing module 34 supplies the operating cost, which considers both monetary cost (e.g., price-per-page) and time cost (e.g., speed) for the devices and estimates the monetary and time costs associated with producing a print job using a selected device configuration. In another embodiment, the costing module 34 estimates the monetary and time costs based on the demand for the type of print job. For example, a monetary cost for a job to produce a product that has higher demand, such as an end-of-quarter financial report, can be increased by the costing module 34 above the standard price-per-page. The monetary cost for a print job may also be adjusted in accordance with price paid by an end-user. For example, the costing module 34 may increase the monetary cost of producing a special edition of a magazine compared to a standard edition of the magazine. The scheduling module 36 monitors the status of devices and device configurations on the shop floor and of print jobs scheduled for production by the selected device configuration(s). In particular, the scheduling module 36 facilitates the prioritization and scheduling of print jobs to selected device configurations. In yet another embodiment, the scheduling module schedules print jobs based, in part, on information from the costing module. For example, a print job that is in high demand and/or has a higher estimated cost can be given a higher priority and scheduled for production before other print jobs having lower demand or costs. As a result, the POC system 10 can optimize the use of resources at the site by producing first the print jobs that will generate the greatest profit.

In another embodiment, one or more of the page layout program 30, the asset management module 32, the costing module 34, and the scheduling module 36 are incorporated into the POC system 10 instead of being coupled to the system as external modules.

In addition, the POC system 10 can analyze information regarding numerous print jobs to optimize the overall use of resources at the site and the production of the collective print jobs. In an embodiment, the configuration engine 22 processes the collective print jobs and the information from the system database 24, the costing module 34, and the scheduling module 36 to identify optimal candidate device configurations that are thereafter assembled on the shop floor. The optimal candidate device configurations for the collective print jobs will typically be different than the optimal device configurations for each particular job. Consequently, the identification and assembly of device configurations can be optimized based on the different device capabilities required by the collective print jobs. In addition, the configuration engine 22 can also process the collective print jobs to optimize the scheduling and production of the collective print jobs. For example, the production of a number of small print jobs may be delayed or rerouted from a first device configuration to a second device configuration so that a large print job can be more effectively produced on the first configuration even though there is an increased cost associated with delaying or rerouting the number of small print jobs. Further, the collective print jobs can be scheduled and produced based on relative priority information from the scheduling module.

The production pipeline controller 26 performs further processing of the print job and produces the print stream in formats compatible with the selected device configurations and print management systems 28 to produce the print job. Generally, the production pipeline controller 26 converts the print stream into a bitmap using a raster image processor (RIP) and sends the print stream to printing devices. The printing devices image the bitmap onto a substrate using toner or ink. In another embodiment, the print stream is sent first to print management systems, wherein the print management systems convert the print stream into a bitmap before sending the bitmap to the devices for production. After the bitmap is imaged onto the substrate, further finishing is performed on the print job, as needed, and the completed print job is sorted and sent to the customer or placed in a mail stream to individual recipients.

Figure 3:
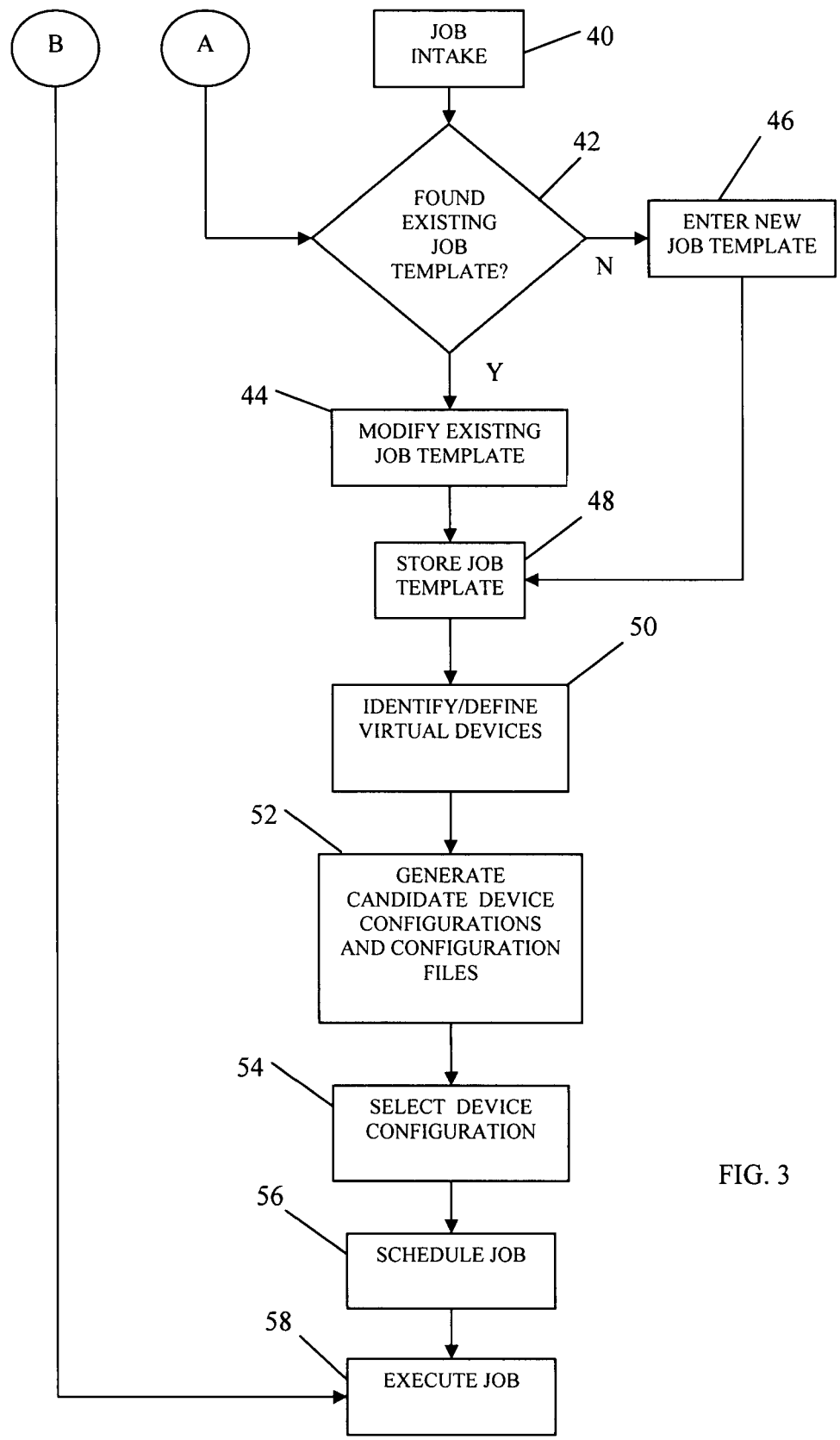
FIG. 3 is a flowchart according to another embodiment demonstrating a job management process.

FIG. 3 shows one embodiment of the general steps performed by the POC system 10 to manage the print job and identify candidate device configurations to produce the print job. At a job intake block 40, the print job including the job specification and job content are loaded into the POC system 10. Following the block 40, a decision block 42, queries the system database 24 for job templates that correspond to the job specification, wherein the search results are analyzed to determine if an existing job template is to be used. Control passes to a block 44 if an existing job template is used, wherein the job template is modified, as necessary, to meet the requirements of the job specification. Otherwise, at a block 46 a new job template is created for the print job. In either case, the job template is stored in the system database 24 at a block 48.

Following the block 48, a block 50 begins the processes of defining one or more virtual devices associated with the job template. Typically, an existing job template will include associated virtual devices. However, if an existing job template has been modified or a new job template has been created then the POC system 10 will modify or define the virtual devices, as needed, to meet the requirements of the job specification. For example, if a new job template is created to produce a magazine, then a virtual device may be defined that can produce printed sheets and that also includes a binding capability. The process of defining a virtual device during the block 50 is generally performed by analyzing the job specification to identify the capabilities needed to produce the print job. Any other well known method of defining a virtual device may be used.

Once the virtual device is defined at block 50, control passes to a block 52 to generate candidate device configurations and configuration files that can reproduce the capabilities of the virtual device. In one embodiment, candidate device configurations and configuration files are generated for each of the virtual devices. In another embodiment, the POC system 10 analyzes the device profiles stored in the system database 24 to generate the device configurations and configuration files. Following the block 52, a block 54 selects a device configuration such as one recommended by the POC system 10 or a different device configuration defined by the production coordinator. In yet another embodiment, multiple device configurations are selected for the production of the print job and the print job is separated into separate print jobs for concurrent production on the multiple device configurations or the print job is produced on the multiple device configurations in stages. In a further embodiment, the POC system 10 automates the definition of virtual devices and the selection of device configurations after the print job is entered and a job template is identified. The system and/or production coordinator may also consider operating cost and throughput information stored in the system database 24 for each device to estimate the time and cost of producing the print job using the selected device configuration. After the device configuration is selected at the block 54, the POC system 10 schedules the print job at a block 56, wherein the scheduling feature of this embodiment facilitates the further prioritization and scheduling of the print jobs sent to the selected device configuration. In another embodiment, the scheduling block 56 is incorporated into the selection block 54 so that a device configuration may be selected to balance the cost and turn-around expectations of the customer.

After the device configuration is selected at the block 54 and the job is scheduled at the block 56, the job is executed at a block 58, wherein the job files undergo further processing and transformations in order to produce the print command stream sent to the devices for production of the print job. The physical assembly of the devices that make up the device configuration is generally performed according to the associated configuration file by a site administrator that oversees the devices on the shop floor.

Figure 4:
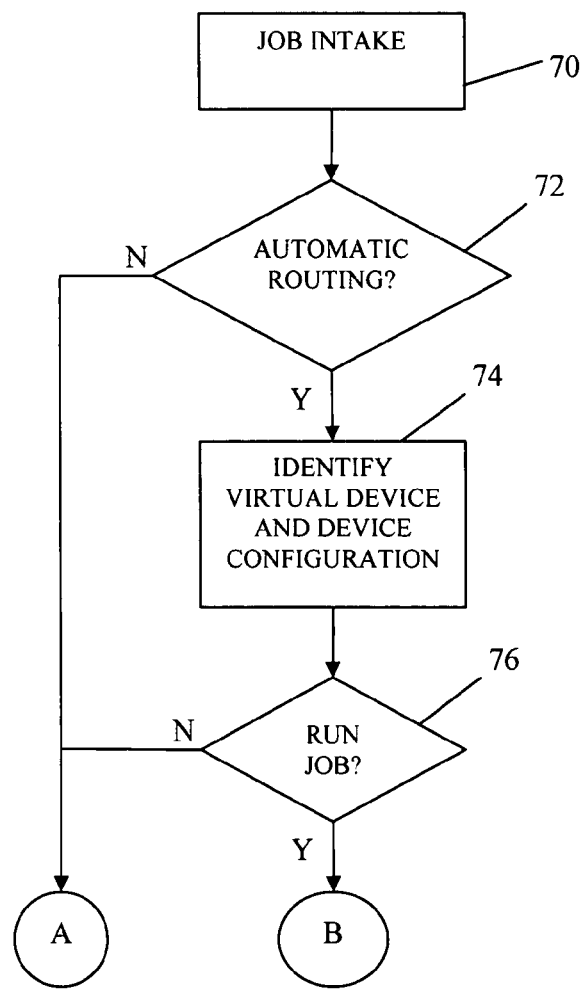
FIG. 4 is a flowchart according to yet another embodiment demonstrating an automatic routing process.

Referring to FIG. 4, an embodiment of an automatically routed print job is shown. In this embodiment, customers have time scheduled at a particular facility so that a print job submitted by the customer can be automatically routed to an assembled device configuration for production. The automatically routed job is typically associated with a job template and associated virtual devices, device configurations, and configuration files. At a block 70, the job request is submitted and the job specification and job content are loaded into the POC system 10. Control then passes to a decision block 72 and a determination is made whether the print job is an auto-routed job. If the job is not auto-routed then control passes back to the block 42 of FIG. 3 and the database is queried for matching job templates and the following processes of FIG. 3 are performed. If the job is an auto-routed job then control passes to a block 74 and the system identifies the device configuration that is to produce the print job. Following the block 74, a decision block 76 determines whether the physical devices making up the device configuration are assembled and can run the job. The print job is executed by the assembled device configuration at the block 58 of FIG. 3 if the print job can be run. If the physical devices have not been assembled or cannot otherwise run the job, then the system is notified and re-routes the job to the block 42 of FIG. 3.

FIG. 5 shows a sample output table 90 of candidate device configurations for producing a print job. The print job includes a job specification 88 that defines the print job as a two page document containing recipient specific information sent to 5,000 recipients, and the customer has requested that the print job be completed in six days for a price $2,500 for the completed product. In addition, the print job associated with FIG. 5 is identified with a job template for producing a utility bill, wherein an associated virtual device requires a duplex printing capability, a sheeting capability to cut the printed sheets to a finished size of 8.5 by 11 inches, and an inserting capability to insert the sheets into envelopes. Device configurations associated with this virtual device are shown in the table 90 of FIG. 5. The table 90 includes a column identifying the physical device configuration 92 and associated information in columns labeled Availability 94, Speed 96, Time 98, Cost/Page 100, and Total Cost 102. The POC system 10 generates the associated information by analyzing and manipulating the information stored for each device and device configuration.

In FIG. 5, a first device configuration includes a Press 1 and an Inserter X; a second device configuration includes a Press 2, a Finisher A, and the Inserter X; and a third device configuration includes a Press 3, a Finisher B, and the Inserter X. In other embodiments, the table includes a more detailed definition of each device configuration. For purposes of this example, the Press 1 is a printer that accepts a roll of paper and can only print in simplex, but also includes a sheeting unit for cutting the printed roll to the proper finished page size. As a result, Press 1 must be run two times to print on both sides of the roll and the paper cut after the second side is printed to produce the finished utility bill. The Press 2 accepts a roll of paper and has the capability of printing in duplex, but does not include a sheeting capability and therefore is configured with the Finisher A to cut the roll into finished pages. The Press 3 accepts sheets of paper and can also print in duplex, but does not have a finishing capability to cut the sheets to the finished size. Consequently, Press 3 is configured with the Finisher B to produce the finished pages of the utility bill. Each of the physical device configurations includes the offline Inserter X that inserts the finished printed sheets into envelopes.

The Availability column 94 shows the status of the device configuration. Examples of status are ready, warming up, offline, inline, busy, etc. For example, the availability of Press 1 and Inserter X is listed as busy, which indicates that the press is currently producing another job, for example. Press 2, Finisher A, and Inserter X are listed as ready to receive the print stream and produce the job. Press 3, Finisher B, and Inserter X are offline and require either the physical configuration of Press 3 and Finisher B or first the printing of the sheets on Press 3 followed by the physical delivery of the printed sheets to the Finisher B. Another embodiment of table 90 includes a column (not shown) that estimates when a busy or offline device will become available.

The Speed column 96 lists the operating speed of the device configuration, for example, in product per minute. The Time column 98 estimates the time, for example, in hours, for the device configuration to complete the print job once the print job is released to the device configuration. The Time column 98 is generated by considering any relevant factor, for example, the size of the job, the speed of each device that makes up the device configuration, the number of press runs needed, the time to assemble the device configuration, and the built in down time to avoid overheating of the devices. For example, the estimated time for the third device configuration is 50 hours, which takes into account various factors including the time it would take to assemble and configure the currently offline devices to make the device configuration ready.

The Cost/Page column 100 is the cost per page (e.g., dollars/page) for producing the print job by the assembled device configuration, which is calculated from the sum of the costs from individual devices. The Total Cost column 102 is the cost to the printing facility for producing the print job on the device configuration, which takes into account any relevant factor, for example, the size of the print job, the cost per page, the number of times that each device must be run to produce the finished product, the labor costs to move work between devices, demand for the product, etc. For example, the total cost for producing the print job on Press 1 includes the cost of running the press twice to print on both sides of the page, cutting the pages to their finished size on the second run, moving the pages to the inserter X, and inserting the pages into envelopes.

The table 90 of FIG. 5 may contain more or less information, as appropriate. For example, if the total cost of producing the print job is the only relevant consideration then the table may only include the device configuration column 92 and the Total Cost column 102. Additional information may also be included in the table 90, for example, compatible formats, physical locations on a shop floor, workloads, quality levels, product demand, etc. In any case, the information shown in FIG. 5 is used by the POC system 10 or the production coordinator to select one or more device configurations to optimize the production of the print job based on such considerations as time and cost. For example, if cost is the most important consideration, then the third device configuration may be selected. In contrast, if time is the most important consideration, then the second device configuration may be selected. The first device configuration may be selected to balance time and cost considerations.

In addition, the production coordinator and/or the POC system 10 can analyze the information from the table 90 for all of the print jobs or groups of print jobs that are to be produced at the facility to optimize the use of device and time resources. In one example, multiple print jobs can be produce by the third device configuration. In this example, the decision is made to produce the multiple print jobs on the third device configuration. Even though the individual times to produce each print job on the currently offline third device configuration is not the fastest, the overall time of producing the multiple print jobs by the device configuration would be optimized once the initial time is spent making the device configuration ready. As a result, the production of jobs and the use of resources at the facility can be optimized as a whole instead of for each job individually. In another example, the POC system 10 may recommend that lower demand products be produced using equipment that is not optimal in order to free-up capacity for other equipment that is optimal for higher demand jobs. It should be apparent that the data collected by the POC system 10 over a period of time regarding jobs being produced at one or more facilities can be used to develop models to re-configure the type of equipment available at such facilities. For example, the model can be used to identify whether addition of equipment at a facility may allow the facility to produce more jobs that have higher profit margins. The models may also be used to identify equipment that is not profitable and should be replaced.

Figure 6:
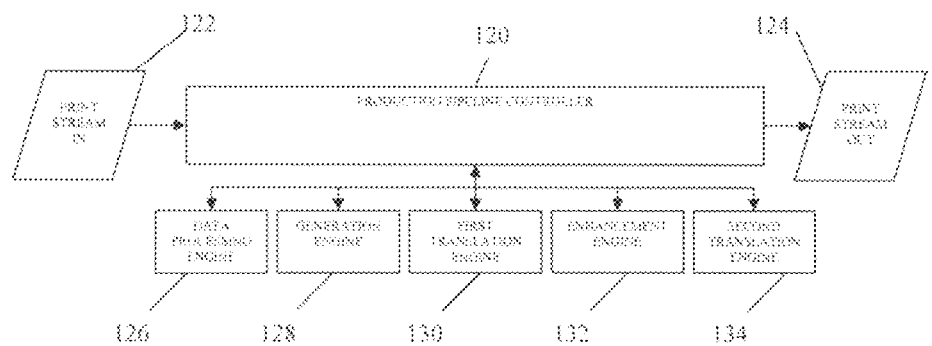
FIG. 6 is a block diagram illustrating an embodiment of a production pipeline controller.

Referring now to FIG. 6, the execution of the print job is described in more detail. When a print job is ready to be released to the selected device configuration for production, the POC system 10 executes additional processing steps to generate the print stream sent to the devices comprising the selected device configuration. The processing steps can be thought of as a pipeline where as soon as a step is completed, the output generated by that step is provided as an input into a subsequent step. One embodiment automates these steps as a production pipeline controller 120 that receives a "print stream in" 122 and ensures that all of the necessary steps are undertaken in order to produce a "print stream out" 124 sent to the selected devices. However, the particular order of the steps may vary in different embodiments. Also, steps that are not dependent on other steps may be undertaken concurrently. The steps that form the production pipeline controller 120 in FIG. 6 are undertaken by a series of engines that process, generate, transform, or enhance the print stream. Any errors that arise during these steps are reported to the production coordinator. Electronic proofing of the job during each of the steps also helps the production coordinator identify errors or problems at an early stage so that they can be corrected.

A data processing engine 126 is used to cleanse, format, and enhance database information about the recipients of the documents produced for the print job. A typical operation provided by the data processing engine 126 includes merging different data sources. For example, the data processing engine 126 may merge an address list from the customer with demographic data and marketing data. The data processing engine 126 may also ensure that addressing information conforms to standards specified by the U.S. Postal Service, sort the data by zip code or postal route, purge duplicate addresses, etc. The data processing engine 126 produces a recipient database or data files that define information regarding the recipients of the documents to be produced.

A print stream generation engine 128 merges the recipient information produced by the data processing engine 126 and the page template to create a merged print stream that comprises documents personalized for each recipient. The merged print stream may be generated using any known method or software tool, for example, XLOpen, a proprietary tool compatible with the present system, and Exstream or GMC PrintNet, which are commercially available document generation tools. Another method of merging the print stream is disclosed in Warmus et. al, U.S. Pat. No. 6,327,599, which is hereby incorporated by reference in its entirety.

A first and second print stream translation engine 130, 134 translate the print stream into a format compatible with subsequent steps or a format used by the devices that comprise the selected device configuration. In one embodiment, the first print stream translation engine 130 is used early by the production pipeline controller 120 to normalize the print files, i.e., those generated by the print stream generation engine 128 and customer provided job files, into a common format for use by subsequent steps, such as those performed by an enhancement engine 132. The second print stream translation engine 134 is used after the enhancement engine 132 and prior to printing to translate the print stream into a format appropriate for the device configuration that is to be used to produce the print job.

Figure 7:
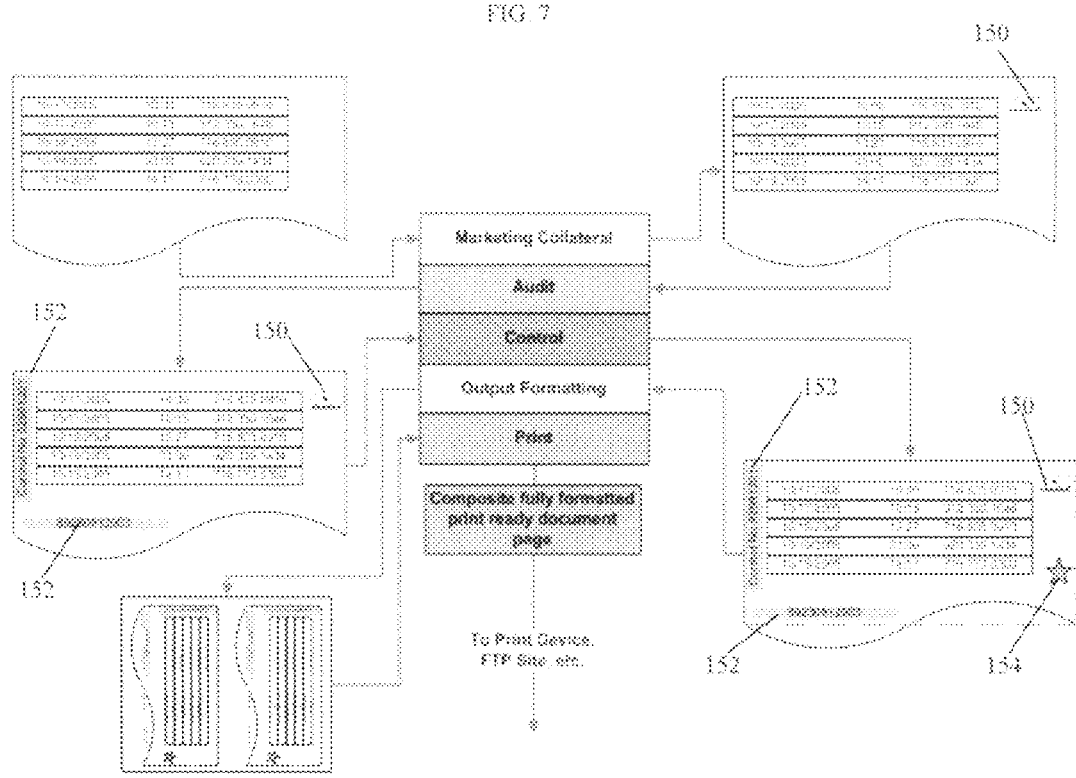
FIG. 7 is a flowchart according to one embodiment of the process performed by a print stream enhancement engine.

Referring to FIGS. 6 and 7, the print stream enhancement engine 132 adds marketing collateral 150, auditing data 152, and control information 154 to the print stream. In FIG. 7, marketing collateral 150 includes messages or images that are added to reserved portions of produced pages. Such messages or images may be generic, i.e., not dependent upon the recipient, or may be based on a recipient profile or content of the message. In some embodiments, the enhancement engine 132 may also determine white space available on the page for the insertion of additional content. An example of the latter would be adding a coupon from a store to a reserved portion of a credit card statement if the credit card statement includes a purchase from the store. Auditing data 152 added to the print stream includes machine and human readable information that is used to track documents through the print facility. Such information may include control numbers or barcodes. Control information 154 added to the print stream includes commands to control the devices such as instructing a press to select a paper stock for certain pages of a document, specifying instructions to a perforator to perforate certain pages of a document, etc. In one embodiment, the first print stream translation engine 130 is used to convert the print stream into a format that is compatible with the format of the added marketing collateral 150 and auditing data 152. The print stream enhancement engine 132 also formats the sequence and orientation of pages in accordance with capabilities of the press that will be used to print the page. For example, a print stream that has pages aligned to print one-up may be configured to print two-up if a press with wider paper is to be used.

Figure 8:
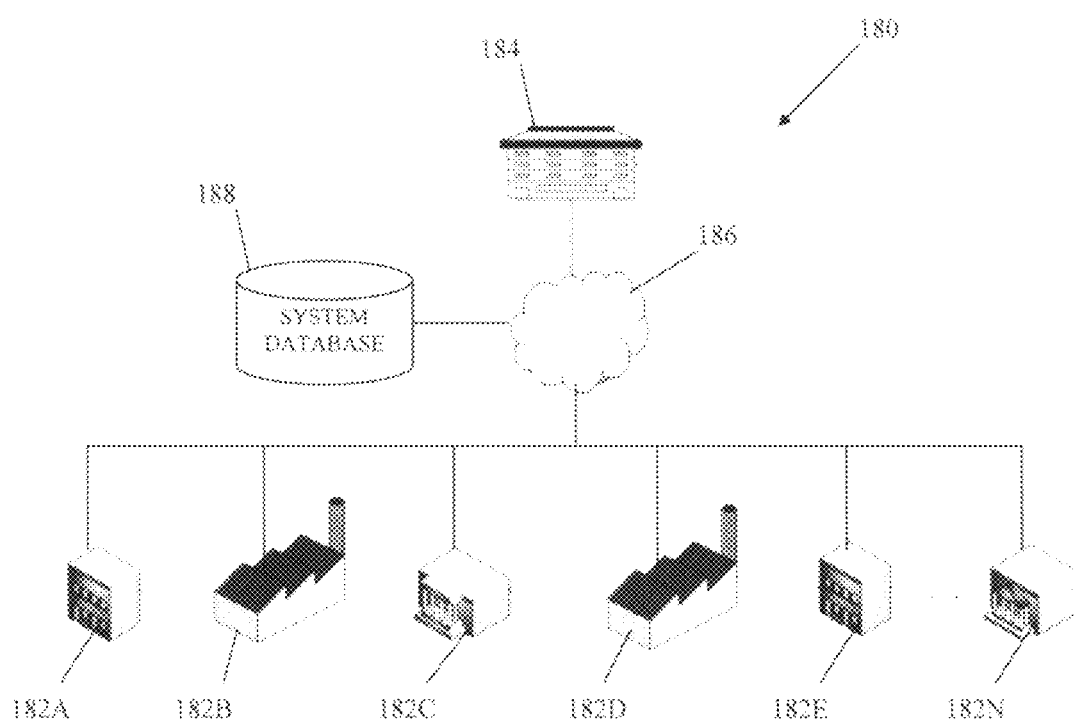
FIG. 8 is a diagram of an infrastructure of a plurality of print facilities implementing the system and/or method according to another embodiment.

In some embodiments, the system is used to manage the production of one or more jobs within a single facility. In other embodiments, the system is used to manage the production of one or more jobs across multiple facilities. FIG. 8 shows such an embodiment of a system 180 implemented within an infrastructure of various distributed facilities 182A-182N or cells 182 connected to each other and to a central site that operates as a production coordination or control cell 184 to manage jobs within the system infrastructure. The control cell can be a separate facility or can also be any of the cells 182A-182N. For example, in FIG. 8, the control cell 184 is a corporate headquarters that receives job requests from customers and assigns the jobs to the various cells 182 for production. However, in other embodiments, any of the cells 182 can act as a control cell 184 that receives a job request and assigns the job for production amongst the infrastructure of multiple cells. Consequently, the system 180 is accessible from each of the cells 182 and control cell 184 and can be independently implemented at any location. Further, there may be any number of cells 182 and control cells 184 that are distributed at different locations throughout the world.

The cells 182 and the control cell 184 are connected to each other via a network 186, such as an intranet or a proprietary network. The network 186 transfers data within the cells 182 and the control cell 184 and between the cells and the control cell. In one embodiment, the network 136 transfers data using TCP/IP. Additionally, the network 186 may be adapted to deliver encrypted information to safeguard the exchange of sensitive information.

In one embodiment, the system 180 is operated at a control cell 184 to select device configurations at one or more cells 182 for the production of a job. For example, a production coordinator at the control cell 184 receives the job specification and content files for a job. A system database 188 stores job templates, virtual device definitions, configuration files, and equipment profiles for each of the cells 182 and the cells and the control cell 184 can access the database 188 via the network 186. The system 20 analyzes the job specification and queries the system database 188 to identify the cells 182 that have the devices that can be used to produce the job. The production coordinator located at the control cell 184 or accessing the system 180 remotely from the control cell uses the system and the system database 186 to select one or more device configurations to produce the job as previously described. In another embodiment, the selection of one or more device configurations is optimized by considering multiple print jobs that are to be produced anywhere in the infrastructure of cells 182. Thereafter, the job is executed similarly to the embodiments described above and a command stream is released to the cell 182 that is capable of producing the job and designated by the production coordinator. In another embodiment, the resources and job content are accessed at the designated cell 182 to generate the command stream sent to the one or more device configurations. A site administrator at the cell 182 manages the assembly of the device configuration according to the configuration file and schedules the job for production.

The system 180 also allows a production coordinator for the control cell 184 to separate a job into multiple cells 182 for production. For example, the production coordinator may wish to separate a national job into three regional jobs, for example, Eastern, Central, and Western regions of the United States, so that the job is produced in the same region as the recipient. In this case, the production coordinator uses the system 182 and the information in the system database 186 to identify and select one or more cells 182 in each of the regions that can be used to produce the job. The system 180 separates customer data into three data sets, one for each region and provides one set to one or more cells 182 within each region. As in the example above, a site administrator for the selected cells 182 then assembles the device configurations to produce the job. In another embodiment, a job is received at a control cell 184 and sent to selected cells 182 in stages. For example, the job may be sent to a first cell for production and subsequently to a second cell for finishing and delivery. In yet another embodiment, a large job can be separated and produced by multiple cells 182 based on capacity and throughput limitations of the individuals cells.

Figure 9:
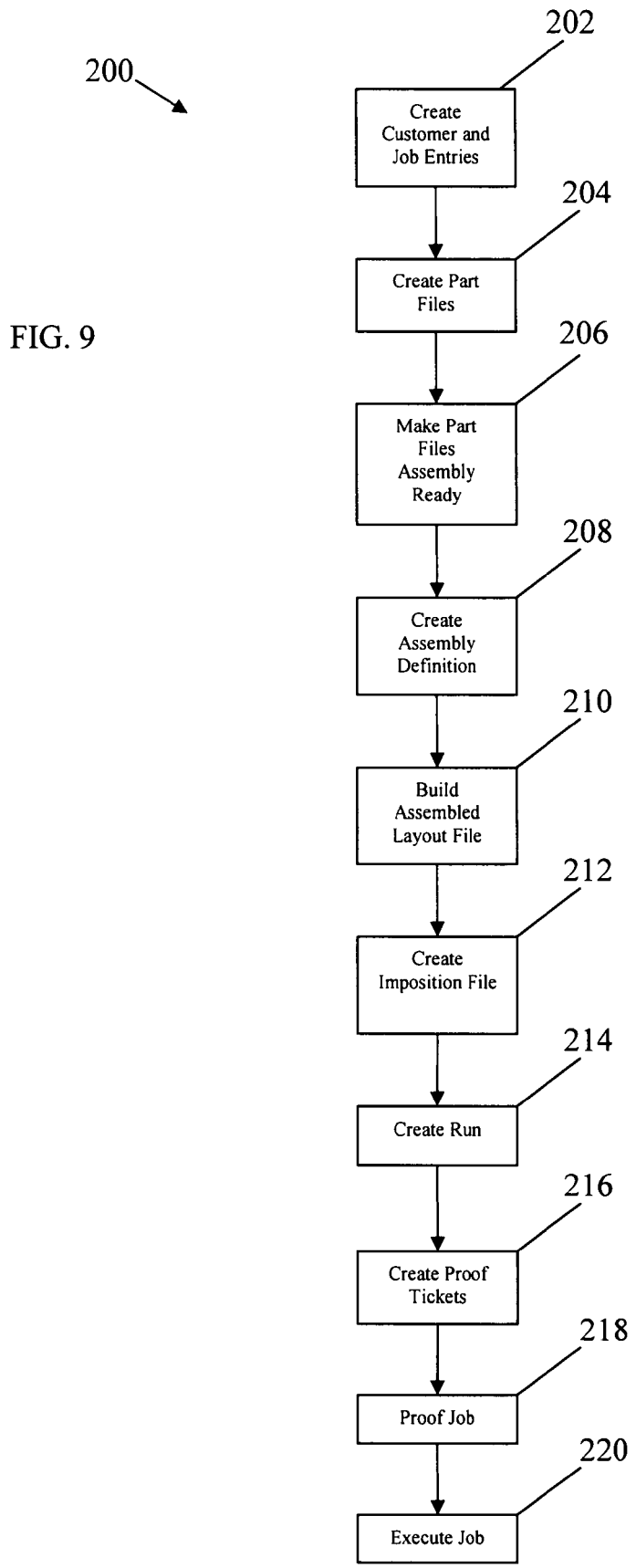
FIG. 9 is a flowchart according to an embodiment of a managed workflow system.

FIG. 9 illustrates a series of steps undertaken by an embodiment of a managed workflow system 200. The managed workflow system 200 "manages" the files that define the print job, for example, one aspect of the managed workflow system includes the page template version control capability described above. Other files managed by the POC system 10 include assembly definitions, part files, assembled layout files, imposition files, resources, job content, etc.

In particular, the processing of the print job in the managed workflow system 200 begins with a block 202 of creating a customer entry and a job entry for the customer. Next, control passes to a block 204 that creates part files for the print job. Specifically, a particular job may include various parts, for example, a printed mail piece includes an original mailing envelope ("OME"), a business return envelope ("BRE"), and a letter. In one embodiment, the part files associated with the various parts of the job are associated with page templates created using QuarkXPress® or other page layout programs.

In other cases, the part files contain only static information that does not vary from document to document. For example, in one print job, the OME and the BRE contain only static information and are basic mailing envelopes with windows through which address information on a letter is displayed. However, in this example, the letter contains variable information and is generated by merging a page template with variable content. Consequently, the print job includes static part files for the OME and BRE and a variable part file for the letter. These part files may have been created previously for other print jobs and may be stored in different files at different locations. In another example, there are different versions of a print job that each contains different OME, BRE, and letter part files. In this example, the print job contains different parts, e.g., the OME, BRE, and letter, and different part files within each part for the different version of the print job.

During a block 206, the managed workflow system 200 retrieves the part files from their various locations, stores the part files in a centralized database or server, and makes the part files assembly ready. In one embodiment, the part files are made assembly ready by converting or transforming the part files into a normalized format, wherein the normalized part files are stored by the managed workflow system 200. As a result, the managed workflow system 200 can access all of the normalized part files that may be combined to create a particular customized print job.

Next, during a block 208, an assembly definition is created that defines the order in which the parts will appear for the print job. In one embodiment, the assembly definition is created utilizing a web application that is accessible by a production coordinator. The production coordinator can select different part files and different versions of part files stored in the system database and drag and drop the desired part files into the assembly definition.

Following the creation of the assembly definition, control passes to a block 210 to build an assembled layout file corresponding to the assembly definition. The assembled layout file is used by the managed workflow system 200 to create the merged documents in a manner similar to the operations performed by the print stream generation engine 128 described above. The managed workflow system 200 displays errors and warnings as they arise during the building block 210. An error will prevent the successful building of the assembled layout file, while a warning will build an assembled layout file, but will indicate an issue that should be addressed. For example, a warning may indicate that a problem will arise if the assembled layout file is to be converted into a particular format that requires additional data definitions that are not supported in the current format of the layout file.

Upon creation of the layout file, a block 212 creates an imposition file that contains finishing instructions for the print job. There may be different imposition files for different versions of the print job. Next, a run entry is created at a block 214. The creation of the run entry includes gathering the files and resources that are used to produce the print job. This process is similar to defining a page specification that is submitted by a customer in the previously described embodiments. In general, the run creation block 214 includes naming and describing the print run, and selecting and identifying the location of the resources.

Following the run creation block 214, a block 216 of creating proof tickets can be performed. The proof tickets can be modified and reused to generate and analyze proofs for various print jobs. Typically, the proof ticket creation block 216 includes naming and defining the proof ticket, for example, designating the proof to include the first 50 records of the job or including only certain parts files of the job. Creating the proof tickets also includes identifying the location of assembled layout files, imposition files, and resources used in the print job so that the files and resources can be retrieved when the job proof is produced. Any errors that occur during the creation of the proof ticket are displayed so that they can be corrected. Thereafter, the proof ticket is stored by the managed workflow system 200 and can be checked-in, checked-out, and modified.

The next block in FIG. 9 is a job proof block 218 that produces the print job according to the proof ticket. Thereafter, the job proof can be examined and additional modifications to the job can be performed, as needed. Once the proofing of the job is complete, the job can be executed at a block 220 and released for production as in the embodiments described above.

Figure 10:
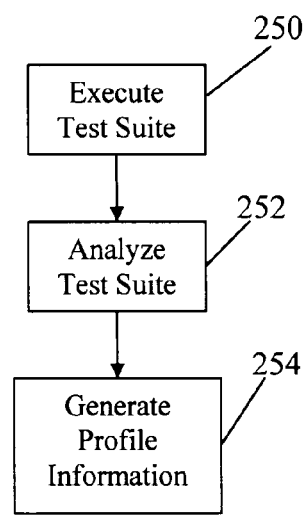
FIG. 10 is a flowchart according to an embodiment of a test suite.

FIG. 10 shows an embodiment of a system that executes a test suite at a block 250 to generate the device profile information used by the system to manage a job. According to one embodiment, the test suite is a sample print job executed using the device. At a block 252 the results of the test suite are analyzed and at a block 254 a capability level of the device is assigned. For example, the assigned level may be a number range between 1 and 10, wherein the profile information indicates the highest level of the test suite successfully executed by the device. The capability levels of the device are grouped into levels of increasingly complex capabilities. For example, one level may include the capabilities to print text at orthogonal rotations in point sizes ranging from 1 point to 100 points and with bold, italics, subscript, superscript, underline, and strikethrough attributes. A higher level may further include the capability to print content at non-orthogonal rotations and decimal point sizes.

In another embodiment, the test suite includes executing multiple sample print jobs at the block 250 on each device using different file formats (e.g., different page description languages). At the block 252 the results of the sample print jobs are analyzed. Thereafter, control passes to the block 254, wherein capability levels associated with the page description languages supported by the device are assigned. The capability levels for different page description languages provide information to the system to determine if it is not only possible, but advisable to produce the print job using a specific device or a combination of devices. For example, in one embodiment, the system facilitates the transformation of a print command stream from a first page description language compatible with a first device to a second page description language compatible with a second device. Some page description languages have more advanced imaging capabilities than others. Consequently, the first and second devices may have different capability levels associated with the first and second page description languages. If the first page description language uses fractional point sizes and the second page description language does not, then the configuration engine 22 may indicate that it is not advisable to convert the print command stream for production using the second device. Similarly, differing resolution levels of the first and second devices may make it inadvisable to use the combination of devices to produce the print job. Consequently, the device profiles stored by the system include information that is used to identify candidate device configurations that are capable of producing the print job, wherein the system ensures that the quality levels of the devices making up the device configurations are adequately matched.

These embodiments have been discussed in the context of managing a print job in a printing facility. However, it should be clear upon reading this specification, that the system would be useful and applicable in any type of application that integrates components having different capabilities in one or more configurations and/or in one or more locations to produce any type of product or service.

INDUSTRIAL APPLICABILITY

This invention is useful in managing the production of a job in and amongst one or more facilities and assigning the job to device configurations for production.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A system for managing a job in accordance with a job specification and job content, comprising:
   a database that stores device information, wherein the stored device information includes the availability of printing devices and finishing devices;
   a configuration engine that analyzes the job specification and the database to identify first and second device configurations capable of producing the job, wherein the first device configuration specifies using a first printing device with a first finishing device and the second device configuration specifies using the first printing device with a second finishing device; and
   a controller responsive to a selection from the first and the second device configurations to produce a command stream in a format compatible with the selection, wherein the database stores device profiles and at least one of virtual device definitions, device configurations, configuration files, and job templates, wherein further the configuration engine associates the job specification with at least one of the virtual device definitions and job templates, and wherein the selection from the first and the second device configurations is based on the association.

2. The system of claim 1, wherein a plurality of device configurations are selected and the controller produces and sends the command stream to the plurality of device configurations to produce the job.

3. The system of claim 2, wherein the plurality of device configurations are located at a plurality of facilities.

4. The system of claim 1, further comprising a data processing engine that enhances the job content, wherein the job content includes information about recipients of the job.

5. The system of claim 4, further comprising a print stream generation engine that merges a page template with the enhanced job content.

6. The system of claim 1, further comprising an enhancement engine that adds additional content and information to the command stream, wherein the enhancement engine adds marketing collateral, auditing data, and control information.

7. The system of claim 1, further comprising a translation engine that converts the command stream into a format compatible with the selected device configuration.

8. The system of claim 1, further comprising a first translation engine that converts the command stream into a format compatible with the selected device configuration, and a second translation engine that converts the command stream into a normalized format before the command stream is converted by the first translation engine.

9. The system of claim 1, further comprising a costing module that estimates the operating costs for producing the job, and wherein the costing module considers demand for the job.

10. The system of claim 9, further comprising a scheduling module that monitors the status of devices and facilitates the prioritization and scheduling of the job, wherein the scheduling module considers information from the costing module.

11. The system of claim 10, wherein the selection from the one or more device configurations is based on information from the costing and scheduling modules regarding a plurality of jobs.

12. The system of claim 1, further comprising an interface through which a user selects one of the one or more device configurations to produce the job.

13. The system of claim 1, wherein the database stores part files and the job specification is assembled by the system from the part files.

14. The system of claim 1, wherein the configuration engine executes a test suite to determine a capability level associated with a device, wherein the test suite includes:
   executing multiple sample jobs on the device with different file formats,
   analyzing the results thereof to assign capability levels associated with file formats supported by the device, and
   storing the capability levels associated with file formats supported by the device in the database, and
   wherein, responsive to the job specification and the database, the configuration engine uses the capability levels to identify the one or more configurations that are capable of producing the job.

15. The system of claim 1, wherein the device configurations include combinations of a plurality of devices located at one or more facilities.

16. The system of claim 1, wherein the configuration engine identifies a third device configuration capable of producing the job, wherein the third device configuration specifies using a second printing device with the second finishing device.

17. A system for managing the production of a print job comprising:
   a database that stores information associated with printing and finishing devices, wherein the information includes device availability and quality levels;
   a configuration engine responsive to a job specification and the database that identifies first and second combinations of devices capable of producing the print job with a quality level that matches a quality level associated with the print job, wherein the first combination specifies using a first printing device with a first finishing device and the second combination specifies using the first printing device with a second finishing device;
   an interface through which a selection is made selecting one or more of the combinations of devices to produce the print job; and
   a controller responsive to the selection from the one or more combinations of devices to convert a command stream into a format compatible with the selection, wherein the database stores device profiles and at least one of virtual device definitions, device configurations, configuration files, and job templates, wherein further the configuration engine associates the job specification with at least one of the virtual device definitions and job templates, and wherein the selection from the one or more combinations of devices is based on the association.

18. The system of claim 17, wherein the controller sends the command stream to a plurality of combinations of devices located at a plurality of print facilities to produce the print job.

19. The system of claim 17, wherein the controller is coupled to a data processing engine, a generation engine, a translation engine, and an enhancement engine.

20. The system of claim 17, wherein the devices are located at a plurality of print facilities connected through a network.

21. The system of claim 17, wherein the database stores part files and the job specification is assembled by the system from the part files.

22. The system of claim 17, further comprising a costing module that estimates an operating cost for producing the print job and a scheduling module that prioritizes and schedules the print job, and wherein the configuration engine identifies one or more optimal combinations of devices based on information from the costing module and the scheduling module regarding a plurality of print jobs.

23. The system of claim 17, wherein the configuration engine identifies a third device combination capable of producing the print job with a quality level that matches the quality level associated with the print job, wherein the third device combination specifies using a second printing device with the second finishing device.

24. A method for managing a job in accordance with a job specification and job content, comprising the steps of:
  storing device information;
  identifying first and second device configurations capable of producing the job, wherein the identification is responsive to the job specification and the stored device information and the first device configuration specifies using a first printing device with a first finishing device and the second device configuration specifies using the first printing device with a second finishing device;
  producing a command stream in a format compatible with a selection from the first and second device configurations to produce the job;
  storing device profiles and at least one of virtual device definitions, device configurations, configuration files, and job templates; and
  associating the job specification with at least one of the virtual device definitions and the job template, wherein the selection from the first and second device configurations is based on the association.

25. The method of claim 24, further comprising sending the command stream to a plurality of device configurations.

26. The method of claim 25, wherein the plurality of device configurations are located at a plurality of facilities.

27. The method of claim 24, further comprising controlling the command stream to enhance the job content with a data processing engine, wherein the job content includes information about the recipients of the job.

28. The method of claim 27, further comprising controlling the command stream to merge a page template with the enhanced job content using a print stream generation engine.

29. The method of claim 28, further comprising the step of controlling the command stream to add additional content and information using a job enhancement engine, wherein the additional content and information includes marketing collateral, auditing data, and control information.

30. The method of claim 24, further comprising converting the command stream into a format compatible with the selected first or second device configuration.

31. The method of claim 30, further comprising converting the command stream into a normalized format before converting the command stream into the format compatible with the selected first or second device configuration.

32. The method of claim 24, further comprising estimating the operating costs for producing the job, wherein the estimation considers demand for the job.

33. The method of claim 32, further comprising prioritizing and scheduling the job, wherein the prioritization and scheduling considers the estimated operating costs for producing the job.

34. The method of claim 33, wherein the step of identifying identifies first and second device configurations based on the estimated operating costs and the prioritization and scheduling information for a plurality of jobs.

35. The method of claim 24, wherein the method includes the further step of running a test suite to obtain the device information and wherein the step of running the test suite comprises the steps of:
  executing multiple sample jobs on the device using different file formats;
  analyzing the results thereof to assign capability levels associated with file formats supported by the device; and
  storing the capability levels associated with the file formats supported by the device, and
  wherein the identification uses the capability levels and is responsive to the job specification and the stored device information.

36. The method of claim 24, further comprising storing part files and assembling the job specification from the part files.

37. The method of claim 24, wherein the step of identifying includes the step of identifying a third device configuration capable of producing the job, wherein the third device configuration specifies using a second printing device with the second finishing device.

38. A method for managing a print job comprising the steps of:
  storing information associated with devices, wherein the information includes device quality levels;
  identifying first and second combinations of devices capable of producing the print job with a quality level that matches a quality level associated with the print job, wherein the first combination specifies using a first printing device with a first finishing device and the second combination specifies using the first printing device with a second finishing device;
  converting a command stream into a format compatible with a selection from the one or more combinations of devices to produce the print job;
  storing device profiles and at least one of virtual device definitions, device configurations, configuration files, and job templates; and
  associating the job specification with at least one of the virtual device definitions and the job template, wherein the selection from the one or more combinations of devices is based on the association.

39. The method of claim 38, further comprising sending the command stream to a plurality of combinations of devices located at a plurality of facilities to produce the print job.

40. The method of claim 39, wherein the command stream is sent to the plurality of combinations of devices based on considerations of cost, time, and geography.

41. The method of claim 38, further comprising controlling the command stream using at least one of a data processing engine, a print stream generation engine, a first and second print stream translation engine, and an enhancement engine.

42. The method of claim 38, further comprising automatically routing the print job to a print facility and producing the print job by a combination of devices located at the print facility.

43. The method of claim 38, further comprising storing part files and assembling the job specification from the part files.

44. The method of claim 38, further comprising estimating the operating costs for producing the print job and prioritizing and scheduling the print job, wherein the identifying step identifies one or more optimal combinations of devices based on the estimated operating costs and the prioritization and scheduling information regarding a plurality of print jobs.

45. The method of claim 38, wherein the step of identifying includes the step of identifying a third combination of devices capable of producing the print job with a quality level that matches a quality level associated with the print job, wherein the third combination of devices specifies using a second printing device with the second finishing device.

* * * * *